G. R. BANTON.
CONTAINER.
APPLICATION FILED APR. 8, 1919.
1,407,688.
Patented Feb. 28, 1922.
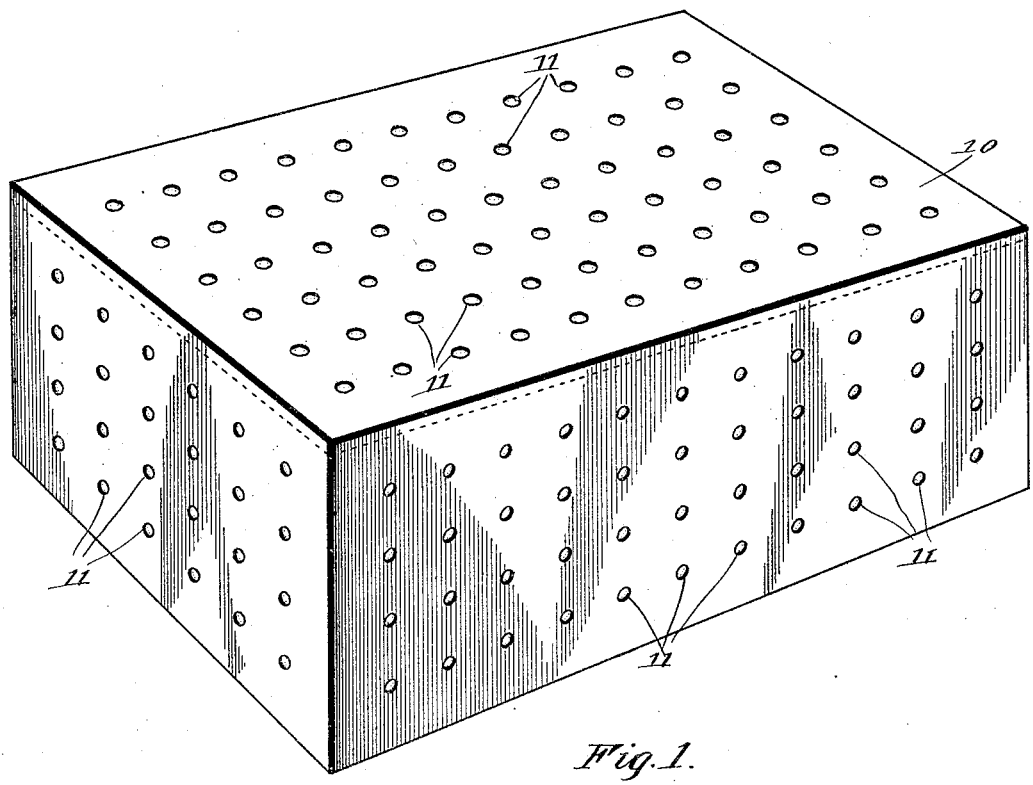
Fig. 1.
Fig. 2.
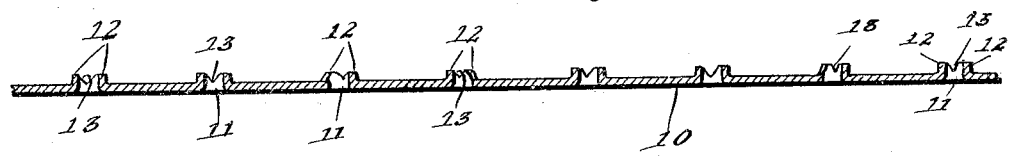
Witnesses
R. A. Thomas.
Inventor
George R. Banton.
By Victor J. Evans
Attorney

UNITED STATES PATENT OFFICE.

GEORGE R. BANTON, OF BUTTERNUT, MICHIGAN.

CONTAINER.

1,407,688.  Specification of Letters Patent.  Patented Feb. 28, 1922.

Application filed April 8, 1919. Serial No. 288,496.

*To all whom it may concern:*

Be it known that I, GEORGE R. BANTON, a citizen of the United States, residing at Butternut, in the county of Montcalm and State of Michigan, have invented new and useful Improvements in Containers, of which the following is a specification.

This invention relates to box-like containers or packing cases especially designed for receiving dried beans, or similar articles, the object being to provide a container for this purpose, which will permit of a free circulation of air to keep the contents in proper condition.

Another object is to provide a container having walls formed with a plurality of openings for the circulation of air, the said opening having inwardly projecting studs or lugs arranged around their peripheries to space the contents from the openings and prevent them from becoming covered so as to interfere with the air circulation.

Other objects and advantages of the invention will appear as the following description is read in connection with the accompanying drawings.

In the drawings:

Figure 1 is a perspective view of a container embodying the present invention.

Figure 2 is an enlarged fragmentary section through one of the walls of the container on a line with the openings.

Referring to the drawings in detail, like characters of reference denote corresponding parts throughout the several views.

The container, as above stated, is especially designed for the reception of dried beans, although it is useful for various other purposes, and it is not the purpose of the present application to limit the invention in this respect. It may be made of various materials, such as paper, cardboard or metal and may be of any desired shape, either square or round, as desired. In the drawings, the container is illustrated as of rectangular formation and its walls 10 are provided with a plurality of openings 11 of suitable size, the openings being so spaced as to permit of free entrance of air to provide circulation within the container. The shape of the openings 11 may vary, it being preferred, however, to make the openings circular and providing around their periphery inwardly projecting lugs or studs. To accomplish this the openings are made by punching the material inwardly to provide circular projections 12, which are disposed at a substantially right angle to the walls of the container and are provided with a plurality of substantially V-shaped notches 13. By this means when the beans or other articles are placed within the container, they will be spaced from the outer edges of the openings and will be prevented from covering the openings by means of the projections 12, the spaces 13 permitting of the entrance of air through the openings, so that a free circulation will not be interfered with.

The container may be sealed, as shown in the drawings, so that its contents may be put up in proper salable form and size, or it may be provided with a removable or hinged cover, this feature, however, not constituting any part of the invention.

The invention is susceptible of various changes as those mentioned in the preceding description, or other changes may be made and the right is herein reserved to make any changes that fall within the scope of the appended claims.

Having described the invention, what is claimed is:

1. A container comprising a receptacle having apertured walls and inwardly projecting studs or lugs surrounding the apertures to space the contents of the container therefrom to permit a free air circulation.

2. A container comprising a receptacle having apertured walls and inwardly projecting studs or lugs spaced around the apertures and formed by bending or punching the material inwardly in the formation of said apertures to space the contents of the container from the apertures and provide air entrances between the studs or lugs.

In testimony whereof I affix my signature.

GEORGE R. BANTON.